United States Patent
Kim et al.

(10) Patent No.: US 12,384,216 B2
(45) Date of Patent: Aug. 12, 2025

(54) APPARATUS FOR AND METHOD OF CONTROLLING VEHICLE SUSPENSION

(71) Applicants: HYUNDAI MOBIS CO., LTD., Seoul (KR); SEOUL NATIONAL UNIVERSITY R&DB FOUNDATION, Seoul (KR)

(72) Inventors: Cheol Joong Kim, Yongin-si (KR); Kyong Su Yi, Seoul (KR); Ja Yu Kim, Seoul (KR)

(73) Assignees: HYUNDAI MOBIS CO., LTD., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 177 days.

(21) Appl. No.: 18/341,977

(22) Filed: Jun. 27, 2023

(65) Prior Publication Data
US 2024/0208290 A1      Jun. 27, 2024

(30) Foreign Application Priority Data
Dec. 27, 2022   (KR) .................. 10-2022-0185743

(51) Int. Cl.
*B60G 17/0165*      (2006.01)
*B60G 17/015*       (2006.01)
(Continued)

(52) U.S. Cl.
CPC ..... *B60G 17/0165* (2013.01); *B60G 17/0155* (2013.01); *B60G 17/0182* (2013.01);
(Continued)

(58) Field of Classification Search
CPC .... B60G 17/015–0157; B60G 17/0165; B60G 17/0182; B60G 2202/152; B60G 2400/0521–0523; B60G 2400/0531–0533; B60G 2400/102; B60G 2400/252; B60G 2400/82; B60G 2400/821; B60G 2400/823; B60G 2401/14; B60G 2401/142; B60G 2401/28;
(Continued)

(56) References Cited

U.S. PATENT DOCUMENTS 9,902,229 B2*  2/2018  Mettrick ............ B60G 17/0182
12,252,111 B2*  3/2025  Noma ................... B60W 10/04

FOREIGN PATENT DOCUMENTS

CN      113147308 A  *  7/2021
KR      10-2021-0076289 A     6/2021
WO      WO-2021106873 A1  *  6/2021  ........... B60G 17/015

OTHER PUBLICATIONS

Lu, H. CN 113147308, machine translation. (Year: 2021).*

* cited by examiner

*Primary Examiner* — Mark L. Greene
(74) *Attorney, Agent, or Firm* — Novo TechIP International PLLC

(57) ABSTRACT

Proposed are an apparatus for and a method of controlling a vehicle suspension. The apparatus includes a sensor configured to acquire at least one of information on a road surface in front of a vehicle and state information of the vehicle; and a processor configured to predict a vehicular behavior based on the information acquired through the sensor and actuator information and to control at least one of a ride height of the vehicle, stiffness of an air spring, and a damping force of a damper based on the predicted vehicular behavior.

13 Claims, 4 Drawing Sheets

(51) Int. Cl.
*B60G 17/018* (2006.01)
*B60G 17/052* (2006.01)
(52) U.S. Cl.
CPC ...... *B60G 17/052* (2013.01); *B60G 2202/152* (2013.01); *B60G 2400/0521* (2013.01); *B60G 2400/0522* (2013.01); *B60G 2400/0523* (2013.01); *B60G 2400/102* (2013.01); *B60G 2400/821* (2013.01); *B60G 2400/823* (2013.01); *B60G 2401/14* (2013.01); *B60G 2401/28* (2013.01); *B60G 2500/10* (2013.01); *B60G 2500/201* (2013.01); *B60G 2500/22* (2013.01); *B60G 2500/30* (2013.01); *B60G 2600/1871* (2013.01); *B60G 2600/20* (2013.01); *B60G 2800/70* (2013.01); *B60G 2800/914* (2013.01)
(58) Field of Classification Search
CPC .......... B60G 2500/201; B60G 2500/22; B60G 2500/30; B60G 2600/1871; B60G 2600/20; B60G 2800/70; B60G 2800/91; B60G 2800/914
See application file for complete search history.

FIG. 2

If max $(A_{z,pre}(k)) \geq 0.3g$
  → Target level = High
  → Target stiffness = soft Else if $0.3g > $ max $(A_{z,pre}(k)) > 0.15g$
  → Target level = Normal
  → Target stiffness = Normal Else
  → Target level = Normal
  → Target stiffness = Hard

APPARATUS FOR AND METHOD OF CONTROLLING VEHICLE SUSPENSION

CROSS-REFERENCE TO RELATED APPLICATIONS

This application claims priority from and the benefit of Korean Patent Application No. 10-2022-0185743, filed on Dec. 27, 2022, which is hereby incorporated by reference for all purposes as if set forth herein.

BACKGROUND

Field

Exemplary embodiments of the present disclosure relate to an apparatus for and a method of controlling a vehicle suspension and, more particularly, to an apparatus for and a method of controlling a vehicle suspension, the apparatus and the method being capable of predicting a vehicular behavior based on vehicle dynamics using information on a road surface in front of a vehicle and controlling a suspension according to information on the predicted vehicle behavior.

Discussion of the Background

Usually, in a case where a vehicle travels on an unpaved road or passes over a speed bump or a pothole on a road, a bottom surface of the vehicle may get scratched, or a vehicle accident may occur due to shock, vibration, or the like.

A suspension of the vehicle is an apparatus that is installed in such a manner as to be coupled to a vehicle shaft and that, as described above, performs control in such a manner as not to directly transfer the shock or vibration from a road surface to a vehicle body while the vehicle travels. With this control, the suspension serves to prevent damage to the vehicle body, damage to a product for transmission in the vehicle, injury to an occupant in the vehicle, a vehicle accident, or the like and to improve ride quality of the vehicle.

The suspension is also called a suspension system, and is configured to include a chassis spring reducing the shock from the road surface, a shock absorber controlling free vibration of the chassis spring and thus improving the ride quality, a stabilizer bar preventing rolling of the vehicle, and the like.

In recent years, an electronic controlled suspension (ECS) has been mounted in the vehicle. The ECS automatically adjusts stiffness of the suspension according to a vehicle traveling condition or a state of the road surface.

In addition, an air suspension has been mounted in the vehicle. The air suspension uses an air spring to improve the ride quality by reducing the shock transferred from the road surface to the vehicle body while the vehicle travels. The air spring may switch between stiffened and softened states by suitably controlling pneumatic pressure inside the air spring. Particularly, the air spring in the air suspension may adjust a ride height of the vehicle by controlling the pneumatic pressure inside the air spring.

The suspension uses a technique of categorizing camera-acquired information on the road surface in front of the vehicle according to a predetermined type (or mode) of the road surface and then controlling damping and the like.

However, a problem with a method of controlling a suspension in the related art is that various road surface conditions are not easily overcome with the predetermined type (mode) of the road surface and that a control error occurs when the suspension is controlled according to the predetermined mode.

The background art of the present disclosure is disclosed in Korean Patent Application Publication No. 10-2021-0076289 (published on Jun. 24, 2021 and entitled "ELECTRONIC CONTROL SUSPENSION CONTROL METHOD AND APPARATUS").

SUMMARY

Various embodiments, which are contrived to solve the above-mentioned problem, are directed to an apparatus for and a method of controlling a vehicle suspension, the apparatus and the method being capable of predicting a vehicular behavior based on vehicle dynamics using information on a road surface in front of a vehicle and controlling a suspension according to information on the predicted vehicular behavior.

In an embodiment of the present disclosure, an apparatus for controlling a vehicle suspension, the apparatus includes: a sensor configured to acquire at least one of information on a road surface in front of a vehicle and state information of the vehicle; and a processor configured to predict a vehicular behavior based on the information acquired through the sensor and actuator information and to control at least one of a ride height of the vehicle, stiffness of an air spring, and a damping force of a damper based on the predicted vehicular behavior.

In an embodiment of the present disclosure, the processor may predict the vehicular behavior based on a result of at least one of computation of the state information of the vehicle and a matrix for 7 degrees of freedom for the vehicle, computation of the actuator information and a system control input matrix, and computation of a matrix for an influence of the information on the road surface in front of the vehicle on the vehicle and the actuator information.

In an embodiment of the present disclosure, the processor may compare a prediction value of at least one of behavioral components included in the predicted vehicular behavior with predetermined reference values and may control at least one of the ride height of the vehicle and the stiffness of the air spring according to a result of the comparison.

In an embodiment of the present disclosure, the processor may perform control at a predetermined time or longer before the vehicle reaches an obstacle, in such a manner that the ride height of the vehicle is set into a high mode and that the stiffness of the air spring is set into a soft mode, in a case where the prediction value of the behavioral component is equal to or higher than a first reference value, may perform control at the predetermined time or longer before the vehicle reaches the obstacle, in such a manner that the ride height of the vehicle is set into a normal mode and that the stiffness of the air spring is set into a normal mode, in a case where the prediction value of the behavioral component is higher than a second reference value and lower than the first reference value, and may perform control at the predetermined time or longer before the vehicle reaches the obstacle, in such a manner that the ride height of the vehicle is set into the normal mode and that the stiffness of the air spring is set into a hard mode, in a case where the prediction value of the behavioral component is equal to or lower than the second reference value, and the first reference value may be higher than the second reference value.

In an embodiment of the present disclosure, the processor may compute an evaluation index based on the predicted vehicular behavior and may control the damping force of the damper based on the computed evaluation index.

In an embodiment of the present disclosure, the processor may compute a damping control input that is to be optimally increased in conjunction with decreasing the evaluation index and may control the damping force of the damper using the computed damping control input.

In an embodiment of the present disclosure, a method of controlling a vehicle suspension includes: receiving, by a processor, at least one of information on a road surface in front of a vehicle, state information of the vehicle, and actuator information; predicting, by the processor, vehicular behavior based on the received information; and controlling, by the processor, at least one of a ride height of the vehicle, stiffness of an air spring, and a damping force of a damper based on the predicted vehicular behavior.

In an embodiment of the present disclosure, in the predicting by the processor of the vehicular behavior, the processor may predict the vehicular behavior based on a result of at least one of computation of the state information of the vehicle and a matrix for 7 degrees of freedom for the vehicle, computation of the actuator information and a system control input matrix, and computation of a matrix for an influence of the information on the road surface in front of the vehicle on the vehicle and the actuator information.

In an embodiment of the present disclosure, in the controlling by the processor of at least one of the ride height of the vehicle, the stiffness of an air spring, and the damping force of the damper, the processor may compare a prediction value of at least one of behavioral components included in the predicted vehicular behavior with predetermined reference values and may control at least one of the ride height of the vehicle and the stiffness of the air spring according to a result of the comparison.

In an embodiment of the present disclosure, in the controlling by the processor of at least one of the ride height of the vehicle, the stiffness of an air spring, and the damping force of the damper, the processor may perform control at a predetermined time or longer before the vehicle reaches an obstacle, in such a manner that the ride height of the vehicle is set into a high mode and that the stiffness of the air spring is set into a soft mode, in a case where the prediction value of the behavioral component is equal to or higher than a first reference value, may perform control at the predetermined time or longer before the vehicle reaches the obstacle, in such a manner that the ride height of the vehicle is set into a normal mode and that the stiffness of the air spring is set into a normal mode, in a case where the prediction value of the behavioral component is higher than a second reference value and lower than the first reference value, and may perform control at the predetermined time or longer before the vehicle reaches the obstacle, in such a manner that the ride height of the vehicle is set into the normal mode and that the stiffness of the air spring is set into a hard mode, in a case where the prediction value of the behavioral component is equal to or lower than the second reference value, and the first reference value may be higher than the second reference value.

In an embodiment of the present disclosure, in the controlling by the processor of at least one of the ride height of the vehicle, the stiffness of an air spring, and the damping force of the damper, the processor may compute an evaluation index based on the predicted vehicular behavior and may control the damping force of the damper based on the computed evaluation index.

In an embodiment of the present disclosure, in the controlling by the processor of at least one of the ride height of the vehicle, the stiffness of an air spring, and the damping force of the damper, the processor may compute a damping control input that is to be optimally increased in conjunction with decreasing the evaluation index and may control the damping force of the damper using the computed damping control input.

According to an aspect of the present disclosure, the apparatus for and the method of controlling a vehicle suspension predict the vehicular behavior based on vehicle dynamics using the information on the road surface in front of the vehicle and control the suspension according to the predicted vehicular behavior. Thus, various road surface conditions can be overcome. Moreover, since it is checked whether or not an actual vehicular behavior is consistent with the predicted vehicular behavior, the suspension can be controlled in a more precise manner.

BRIEF DESCRIPTION OF THE DRAWINGS

FIG. 2 is a diagram that is referred to for description of a method of controlling an air spring based on vehicular behavior prediction according to an embodiment of the present disclosure.

DETAILED DESCRIPTION

Figure 1:
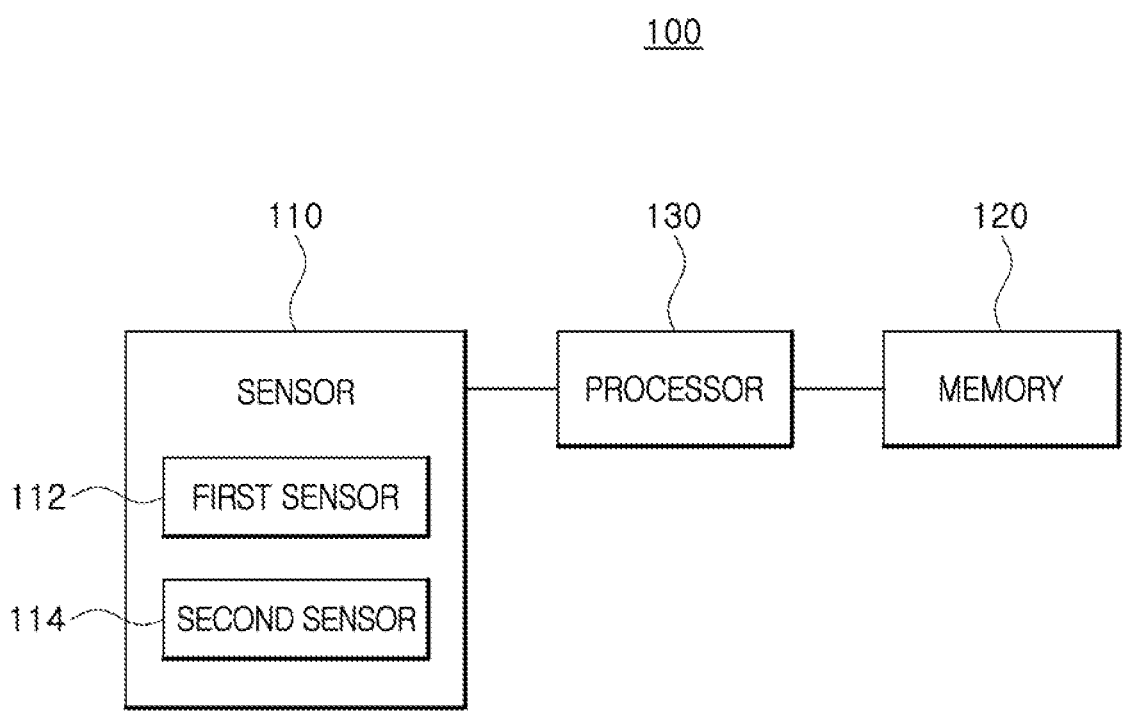
FIG. 1 is a block diagram schematically illustrating a configuration of an apparatus for controlling a vehicle suspension according to an embodiment of the present disclosure.

An apparatus for and a method of controlling a vehicle suspension according to embodiments of the present disclosure will be described in detail below with the accompanying drawings. For clarity and convenience in description, thicknesses of lines, sizes of constituent elements, and the like may be illustrated in non-exact proportion in the drawings. In addition, terms defined by considering the meanings thereof in the present disclosure will be used below and may vary according to the user's or manager's intention or according to practices in the art. Therefore, the terms should be contextually defined in light of the present specification.

A feature of the present disclosure described in the present specification may be realized in the form of, for example, a method, a process, an apparatus, a software program, a data stream, or a signal. The feature, although described in terms of realization in a single form (for example, described as only in the form of a method), may also be realized in a different form (for example, in the form of an apparatus or a program). The apparatus may be implemented in the form of adequate hardware, software, firmware, or the like. The method may be realized in, for example, a computer or a device, such as a microprocessor or a processor that usually refers to an integrated circuit or a processing device, such as a programmable logic device. Examples of the processor also include a computer and a communication device, such as a cellular phone or a portable/personal information terminal (a personal digital assistant ("PDA"), that facilitate communication of information between end users.

Figure 3:
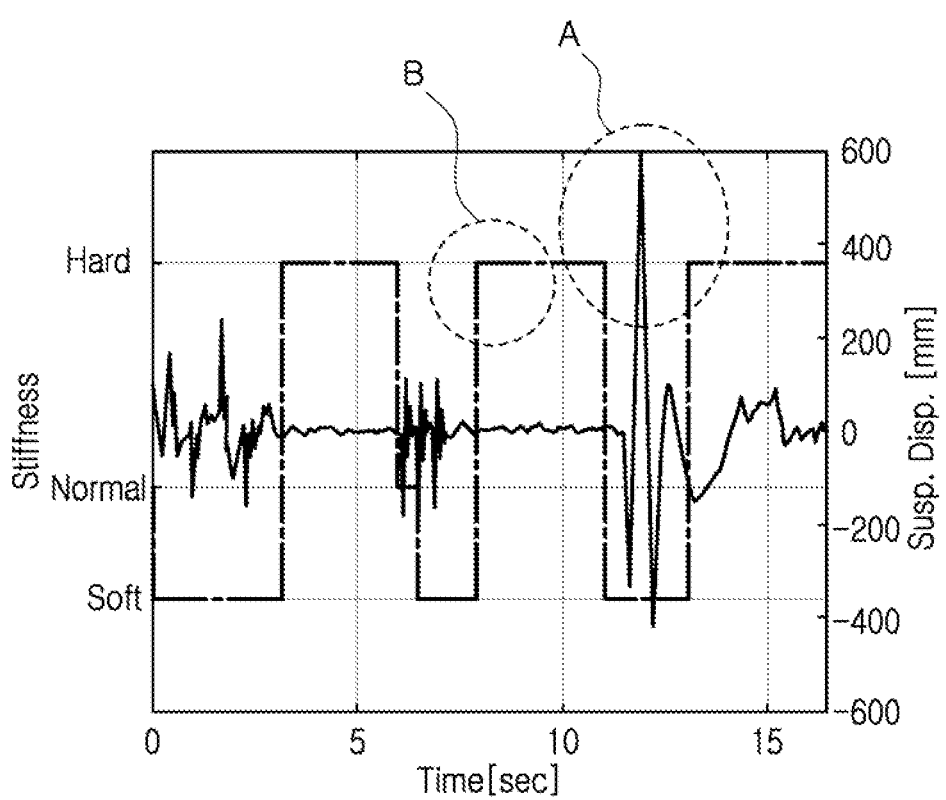
FIG. 3 is a graph that is referred to for description of a point in time where the air spring is controlled based on the vehicular behavior prediction according to the embodiment of the present disclosure.

FIG. 1 is a block diagram schematically illustrating a configuration of an apparatus 100 for controlling a vehicle suspension according to the embodiment of the present disclosure. FIG. 2 is a diagram that referred to description of a method of controlling an air spring based on vehicular behavior prediction according to an embodiment of the present disclosure. FIG. 3 is a graph that is referred to for description of a point in time where the air spring is controlled based on the vehicular behavior prediction according to the embodiment of the present disclosure.

With reference to FIG. 1, the apparatus 100 for controlling a vehicle suspension according to the embodiment of the present disclosure includes a sensor 110, a memory 120, and a processor 130.

A memory 120 is a constituent element in which data associated with operation of the apparatus 100 for controlling a vehicle suspension is stored. Particularly, stored in the memory 120 are an application (program or applet) and the like that predict a vehicular behavior based on at least one of information on a road surface in front of a vehicle, state information of the vehicle, and actuator information and control at least one of a ride height of the vehicle, stiffness of the air spring, a damping force of a damper based on the predicted vehicular behavior. According to need, the processor 130 may selectively read pieces of information stored in the memory 120. That is, stored in the memory 120 are various types of data that occur while an operating system and a control application (program or applet) for driving the apparatus 100 for controlling a vehicle suspension are executed. At this point, a non-volatile storage device that keeps information stored without being supplied with electric power and a volatile storage device that needs to be supplied with electric power to keep information stored are collectively referred to as the memory 120. In addition, the memory 120 may perform a function of temporarily or permanently storing data that are processed by the processor 130. At this point, examples of the memory 120 may include a magnetic storage medium and a flash storage medium in addition to the volatile storage device that needs to be supplied with electric power to keep information stored, but the scope of the present disclosure is not limited to these mediums.

The sensor 110 may detect at least one of the information on the road surface in front of the vehicle and the state information of the vehicle.

Accordingly, the sensor 110 may include a first sensor 112 that acquires the information on the road surface in front of the vehicle and a second sensor 114 that acquires the state information of the vehicle.

A camera, a lidar sensor, a radar sensor, an ultrasonic sensor, or the like may be used as the first sensor 112. The first sensor 112 may acquire the information on the road surface in front of the vehicle. The information here on the road surface in front of the vehicle may include a height of a road surface, a distance to the road surface, a state of the road surface (for example, an uphill road, a downhill road, or a winding road), and the like. The distance to the road surface refers to a distance in a direction in which the vehicle travels.

The first sensor 112 may capture an image of the road surface in front of the vehicle and, from the captured image of the road surface, may acquire the information on the road surface in front of the vehicle that includes the height of the road surface, the distance to the road surface, and the like. The first sensor 112 may be mounted on a front wind shield of the vehicle and may capture the image of the road surface in front of the vehicle. The first sensor 112 may acquire the information on the road surface in front of the vehicle that includes the height of the road surface, a depth of the road surface, the length of the road surface, and the like, from the captured image of the road surface in front of the vehicle.

The second sensor 114 may acquire the state information of the vehicle that includes suspension displacement, vertical acceleration, roll, pitch, and the like. Examples of the second sensor 114 may include a vehicle height sensor, an IMU sensor, an acceleration sensor, a wheel speed sensor, a steering angle sensor, a lateral acceleration sensor, and the like.

The processor 130 may predict the vehicular behavior based on the information that is acquired by the sensor 110 and the actuator information and may control at least one of the ride height of the vehicle, the stiffness of the air spring, and the damping force of the damper based on the predicted vehicular behavior. At this point, the actuator information may include values of a user-controlled actuator, such as the damping force of the damper and the stiffness of the air spring.

The processor 130 may predict the vehicular behavior based on the information on the road surface in front of the vehicle that is received from the first sensor 112 and of the state information of the vehicle and the actuator information that are received from the second sensor 114. At this point, the processor 130 may predict the vehicular behavior using a Kalman filter or the like.

The processor 130 may predict the vehicular behavior using Equation 1 that follows.

$$x_k = Fx_{k-1} + Gu_{k-1} + G_w w_{k-1} \qquad \text{Equation 1}$$

In Equation 1, xx depicts the predicted vehicular behavior, $x_{k-1}$ depicts the state information of the vehicle (the current vehicular behavior), $u_{k-1}$ depicts the actuator information, and $w_{k-1}$ depicts the information on the road surface in front of the vehicle. Moreover, in Equation 1, F depicts a matrix for 7 degrees of freedom for the vehicle, G depicts a system control input matrix, Gw depicts a matrix (a matrix for an influence of the information on the road surface in front of the vehicle on the vehicle) indicating to what degree the information on the road surface in front of the vehicle has an influence on the vehicle. These values may be predetermined. The predicted vehicular behavior may include prediction values of behavioral components, such as pitch, roll, yaw, and vertical acceleration. Therefore, the predicted vehicular behavior may include a vertical-acceleration prediction value, a roll prediction value, a pitch prediction value, and the like. Vertical acceleration indicates a behavior of the vehicle that moves in the vertical direction, pitch indicates a behavior of the vehicle that moves forward or backward in the upward-downward direction, roll indicates a behavior of the vehicle that moves forward in the leftward-rightward direction, and yaw indicates a behavior of the vehicle that rotates leftward or rightward while leveling off.

The processor 130, as expressed in Equation 1, may predict the vehicular behavior based on a result of at least one of computation of the state information of the vehicle and the matrix for the 7 degrees of freedom for the vehicle, computation of the actuator information and the system control input matrix, and computation of the matrix for the influence of the information on the road surface in front of the vehicle on the vehicle and the actuator information.

When the information on the vehicular behavior is predicted, the processor 130 may control at least one of the ride height of the vehicle, the stiffness of the air spring, and the damping force of the damper based on the predicted vehicular behavior.

The processor 130 may compare the prediction value of at least one of the behavioral components that are included in the information on the vehicular behavior, with preset reference values. According to a result of the comparison, the processor 130 may control at least one of the ride height of the vehicle and the stiffness of the air spring.

Specifically, in a case where the prediction value of the behavioral component is equal to or higher than a first reference value, the processor 130 may perform control at a predetermined time or longer before the vehicle reaches an obstacle, in such a manner that the ride height of the vehicle is set into a high mode and that the stiffness of the air spring is set into a soft mode. Furthermore, in a case where the prediction value of the behavioral component is higher than a second reference value and is lower than the first reference value, the processor 130 may perform control at the predetermined time or longer before the vehicle reaches the obstacle, in such a manner that the ride height of the vehicle is set into a normal mode and that the stiffness of the air spring is set into a normal mode. Furthermore, in a case where the prediction value of the behavioral component is equal to or lower than the second reference value, the processor 130 may perform control at the predetermined time or longer before the vehicle reaches the obstacle, in such a manner that the ride height of the vehicle is set into the normal mode and that the stiffness of the air spring is set into a hard mode. The first reference value here may be higher than the second reference value. A user may change types of the behavioral components and the reference values (the first reference value and the second reference value) that are used in order to control the ride height and the stiffness of the air spring.

For example, a method of controlling the ride height of the vehicle and the stiffness of the air spring using the vertical-acceleration prediction value included in the predicted vehicular behavior is described with reference to FIG. 2. In this case, the vertical-acceleration prediction value may be a maximum vertical-acceleration prediction value. In a case where the vertical-acceleration prediction value (Az, pre(k)) is equal to or higher than a first reference vertical acceleration (for example, 0.3 g), the processor 130 may control the ride height of the vehicle (a target level) in such a manner as to be set into the high mode and may control the stiffness of the air spring (a target stiffness) in such a manner as to be set into the soft mode. In addition, in a case where the vertical-acceleration prediction value (Az, pre(k)) is lower than the first reference vertical acceleration and is higher than a second reference vertical acceleration (for example, 0.15 g), the processor 130 may perform control in such a manner that the ride height of the vehicle (the target level) is set into the normal mode and may perform control in such a manner that the stiffness of the air spring (the target stiffness) is set into the normal mode. In addition, in a case where the vertical-acceleration prediction value (Az, pre(k)) is equal to or lower than the second reference vertical acceleration, the processor 130 may perform control in such a manner that the ride height of the vehicle (the target level) is set into the normal mode and may perform control in such a manner that the stiffness of the air spring (the target stiffness) is set into the hard mode.

As described above, before the vehicle reaches the obstacle (before the suspension displacement changes), the processor 130 may change the ride height of the vehicle and the stiffness of the air spring according to the predicted vehicular behavior, and thus ride quality can be further improved.

For example, a method of controlling the stiffness of the air spring in a case where the information on the vehicular behavior is predicted as illustrated in FIG. 3 is described. With reference to FIG. 3, a value at a circular portion A on the predicted vehicular behavior is higher than a predetermined value, 10 seconds earlier, the processor 130 controls the stiffness of the air spring in such a manner as to be set into the hard mode. Thus, the ride quality can be further improved.

The control of the ride height of the vehicle and the stiffness of the air spring are controlled through suspension control based on the predicted vehicular behavior makes it possible to switch between the modes according to the responsiveness and characteristics of a system. However, the damping force of the damper has to be controlled in a manner that corresponds to the vehicular behavior that continuously changes according to the state of the road surface. Therefore, it is necessary to continuously control the damping force of the damper as opposed to the control of the ride height of the vehicle and the stiffness of the air spring through the suspension control.

Accordingly, the processor 130 may perform predictive control (preview control) of the damping force of the damper based on the predicted vehicular behavior. At this point, the processor 130 may additionally include feedforward control, based on the information on the road surface in front of the vehicle, in logic for controlling the damping force of the damper without the information on the road surface in front of the vehicle in the related art, and thus may perform the predictive control of the damping force of the damper.

In addition, the processor 130 may compute the damping force of the damper based on the information on the vehicular behavior that is predicted based on the information on the road surface in front of the vehicle and the state information of the vehicle. That is, the processor 130 may compute an evaluation index based on the predicted vehicular behavior and may control the damping force of the damper based on the computed evaluation index. At this point, the processor 130 may compute the evaluation index by combining values of the behavioral components included in the predicted vehicular behavior. The evaluation index may be an index for evaluating the ride quality based on the predicted vehicular behavior. After computing the evaluation index, the processor 130 computes a damping control input that is to be optimally increased in conjunction with decreasing the evaluation index and may control the damping force of the damper using the computed damping control input.

The processor 130 may be electrically connected to a suspension (not illustrated) and may control operation of the suspension. The suspension may include a spring (not illustrated) and a damper (not illustrated) that are provided to each vehicle wheel. The spring is compressed or expanded according to the state of the road surface and thus has a reciprocating motion.

Figure 4:
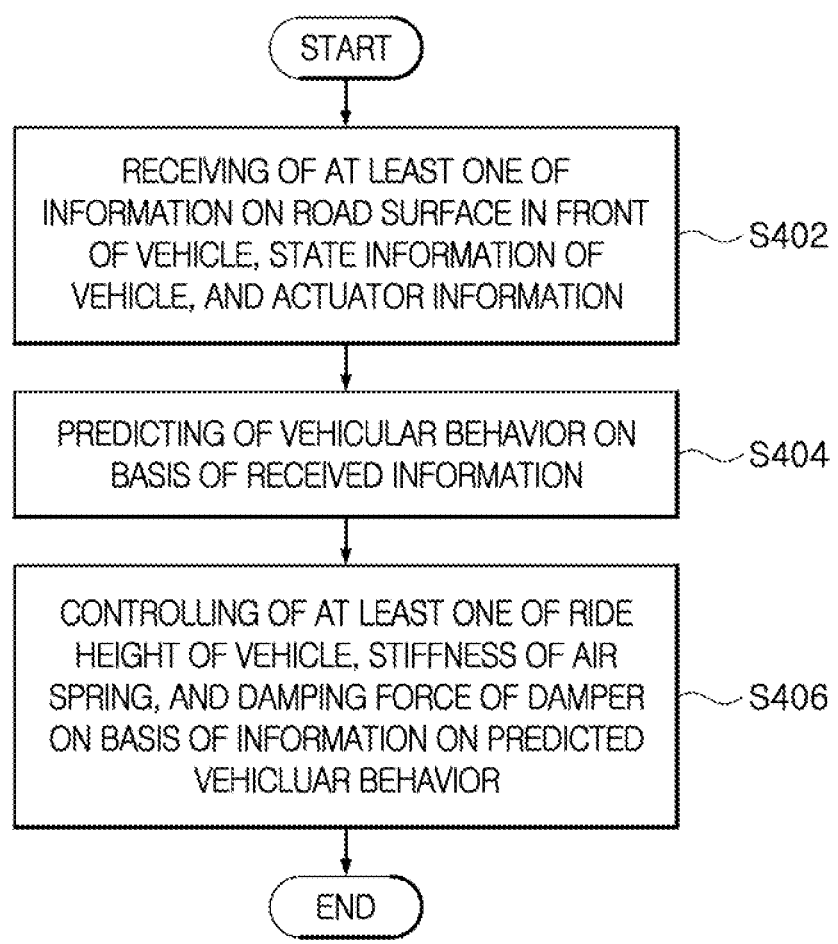
FIG. 4 is a flowchart that is referred to for description of a method of controlling a vehicle suspension according to an embodiment of the present disclosure.

FIG. 4 is a flowchart that is referred to for description of a method of controlling a vehicle suspension according to an embodiment of the present disclosure, With reference to FIG. 4, the processor 130 receives at least one of the information on the road surface in front of the vehicle, the state information of the vehicle, and the actuator information (S402). At this point, the processor 130 may receive the information on the road surface in front of the vehicle that includes the height, length, and the like of the road surface from the first sensor 112 and may receive the state information of the vehicle that includes the suspension displacement, the vertical acceleration, the roll, the pitch, and the like from the second sensor 114. In addition, the processor 130 may receive the actuator information that includes control values of the actuators through a communication network.

When Step S402 is performed, the processor 130 predicts the vehicular behavior based on at least one of the information on the road surface in front of the vehicle, the state information of the vehicle, and the actuator information (S404). At this point, the processor 130, as expressed in Equation 1, may predict the vehicular behavior based on the result of at least one of the computation of the state information of the vehicle and the matrix for the 7 degrees of freedom for the vehicle, the computation of the actuator information and the system control input matrix, and the computation of the matrix for the influence of the information on the road surface in front of the vehicle on the vehicle and the actuator information.

When Step S404 is performed, the processor 130 control at least one of the ride height of the vehicle, the stiffness of the air spring, and the damping force of the damper based on the predicted vehicular behavior (S406).

The processor 130 may compare the prediction value of at least one of the behavioral components that are included in the information on the vehicular behavior, with preset reference values. According to a result of the comparison, the processor 130 may control at least one of the ride height of the vehicle and the stiffness of the air spring.

Specifically, in the case where the prediction value of the behavioral component is equal to or higher than the first reference value, the processor 130 may perform control at the predetermined time or longer before the vehicle reaches the obstacle, in such a manner that the ride height of the vehicle is set into the high mode and that the stiffness of the air spring is set into the soft mode. Furthermore, in the case where the prediction value of the behavioral component is higher than the second reference value and is lower than the first reference value, the processor 130 may perform control at the predetermined time or longer before the vehicle reaches the obstacle, in such a manner that the ride height of the vehicle is set into the normal mode and that the stiffness of the air spring is set into the normal mode. In addition, in the case where the prediction value of the behavioral component is equal to or lower than the second reference value, the processor 130 may perform control at the predetermined time or longer before the vehicle reaches the obstacle, in such a manner that the ride height of the vehicle is set into the normal mode and that the stiffness of the air spring is set into the hard mode.

In addition, the processor 130 may compute the evaluation index based on the predicted vehicular behavior and may control the damping force of the damper based on the computed evaluation index. At this point, the processor 130 may compute the evaluation index by combining the values of the behavioral components included in the predicted vehicular behavior. The evaluation index may be an index for evaluating the ride quality based on the predicted vehicular behavior. After computing the evaluation index, the processor 130 computes the damping control input (damping current) that is to be optimally increased in conjunction with decreasing the evaluation index and may control the damping force of the damper using the computed damping control input (damping current).

In this manner, the apparatus for and the method of controlling a vehicle suspension according to the embodiments of the present disclosure predict the vehicular behavior based on vehicle dynamics using the information on the road surface in front of the vehicle and control the suspension according to the predicted vehicular behavior. Thus, various road surface conditions can be overcome. Moreover, since it is checked whether or not an actual vehicular behavior is consistent with the predicted vehicular behavior, the suspension can be controlled in a more precise manner.

The embodiments of the present disclosure are described only in an exemplary manner with reference to the drawings. From the description of the embodiments, it would be understandable by a person of ordinary skill in the art to which the present disclosure pertains that various modifications are possibly made to the embodiments and that an embodiment equivalent thereto is possibly practiced. Therefore, the proper technical scope of the present disclosure should be defined by the following claims.

What is claimed is:

1. An apparatus for controlling a vehicle suspension system of a vehicle, the apparatus comprising:
    a sensor configured to acquire at least one of information on a road surface in front of a vehicle and state information of the vehicle; and
    a processor configured to predict a vehicular behavior based on the information acquired through the sensor and actuator information and to control at least one of a ride height of the vehicle and a stiffness of an air spring based on the predicted vehicular behavior;
    wherein the processor, as configured, performs, before the vehicle reaches an obstacle:
        setting the ride height of the vehicle into a high mode and the stiffness of the air spring into a soft mode when a prediction value of the predicted vehicular behavior is equal to or higher than a first reference value;
        setting the ride height of the vehicle into a normal mode and the stiffness of the air spring into a normal mode, when the prediction value of the predicted vehicular behavior is higher than a second reference value and lower than the first reference value; and
        setting the ride height of the vehicle into the normal mode and the stiffness of the air spring into a hard mode when the prediction value of the predicted vehicular behavior is equal to or lower than the second reference value, and
    wherein the first reference value is higher than the second reference value.

2. The apparatus of claim 1, wherein the processor, as configured, predicts the vehicular behavior based on a computation of the state information of the vehicle and a matrix for 7 degrees of freedom for the vehicle.

3. The apparatus of claim 1, wherein the processor, as configured, compares a prediction value of at least one of behavioral components included in the predicted vehicular behavior with one or more predetermined reference values and controls at least one of the ride height of the vehicle and the stiffness of the air spring according to a result of the comparison.

4. The apparatus of claim 1, wherein the processor, as configured,
    computes an evaluation index that is an index for evaluating ride quality of the vehicle based on the predicted vehicular behavior, and
    controls a damping force of a damper based on the computed evaluation index.

5. The apparatus of claim 4, wherein the processor, as configured, computes a damping control input that is to be optimally increased in response to a decrease in the evaluation index and controls the damping force of the damper using the computed damping control input.

6. The apparatus of claim 1, wherein the processor, as configured, predicts the vehicular behavior based on a computation of the actuator information and a system control input matrix indicating to what degree the information on the road surface in front of the vehicle has an influence on the vehicle.

7. A method of controlling a vehicle suspension, the method comprising:
  receiving at least one of information on a road surface in front of a vehicle, state information of the vehicle, and actuator information;
  predicting vehicular behavior based on the received information; and
  controlling at least one of a ride height of the vehicle, a stiffness of an air spring, and a damping force of a damper based on the predicted vehicular behavior;
  wherein in the controlling of at least one of the ride height of the vehicle, the stiffness of the air spring, and the damping force of the damper, the method comprising comparing a prediction value of at least one of behavioral components included in the predicted vehicular behavior with one or more predetermined reference values and controlling at least one of the ride height of the vehicle and the stiffness of the air spring according to a result of the comparison.

8. The method of claim 7, wherein in the predicting of the vehicular behavior, the method comprising predicting the vehicular behavior based on a computation of the state information of the vehicle and a matrix for 7 degrees of freedom for the vehicle.

9. The method of claim 7, wherein in the controlling of at least one of the ride height of the vehicle, the stiffness of the air spring, and the damping force of the damper, the method further comprises performing:
  control at a predetermined time or longer before the vehicle reaches an obstacle, in such a manner that the ride height of the vehicle into a high mode and that the stiffness of the air spring into a soft mode, in a case where the prediction value of the behavioral component is equal to or higher than a first reference value;
  control at the predetermined time or longer before the vehicle reaches the obstacle, in such a manner that the ride height of the vehicle into a normal mode and that the stiffness of the air spring into a normal mode, in a case where the prediction value of the behavioral component is higher than a second reference value and lower than the first reference value; and
  control at the predetermined time or longer before the vehicle reaches the obstacle, in such a manner that the ride height of the vehicle into the normal mode and that the stiffness of the air spring into a hard mode, in a case where the prediction value of the behavioral component is equal to or lower than the second reference value, and
  wherein the first reference value is higher than the second reference value.

10. The method of claim 7, wherein in the controlling of at least one of the ride height of the vehicle, the stiffness of the air spring, and the damping force of the damper, the method further comprises:
  computing an evaluation index that is an index for evaluating ride quality of the vehicle based on the predicted vehicular behavior and
  controlling the damping force of the damper based on the computed evaluation index.

11. The method of claim 10, wherein in the controlling of at least one of the ride height of the vehicle, the stiffness of the air spring, and the damping force of the damper, the method further comprises computing a damping control input that is to be optimally increased in response to a decrease in the evaluation index and controlling the damping force of the damper using the computed damping control input.

12. The method of claim 7, wherein in the predicting of the vehicular behavior, the method further comprises predicting the vehicular behavior based on a computation of the actuator information and a system control input matrix indicating to what degree the information on the road surface in front of the vehicle has an influence on the vehicle.

13. An apparatus for controlling a vehicle suspension system of a vehicle, the apparatus comprising:
  a sensor configured to acquire at least one of information on a road surface in front of a vehicle and state information of the vehicle; and
  a processor configured to predict a vehicular behavior based on the information acquired through the sensor and actuator information and to control at least one of a ride height of the vehicle, stiffness of an air spring, and a damping force of a damper based on the predicted vehicular behavior;
  wherein the processor, as configured, compares a prediction value of at least one of behavioral components included in the predicted vehicular behavior with one or more predetermined reference values and controls at least one of the ride height of the vehicle and the stiffness of the air spring according to a result of the comparison.

* * * * *